No. 675,692. Patented June 4, 1901.
N. WEHR.
STOCK WATERING DEVICE.
(Application filed Feb. 18, 1901.)
(No Model.)

Witnesses:
R. J. Davenport.
Agnes Levi.

Inventor
Nickolaus Wehr
by Geo. W. Sues.

UNITED STATES PATENT OFFICE.

NICKOLAUS WEHR, OF PORTSMOUTH, IOWA.

STOCK-WATERING DEVICE.

SPECIFICATION forming part of Letters Patent No. 675,692, dated June 4, 1901.

Application filed February 13, 1901. Serial No. 47,172. (No model.)

*To all whom it may concern:*

Be it known that I, NICKOLAUS WEHR, residing at Portsmouth, in the county of Shelby and State of Iowa, have invented certain useful Improvements in Stock-Watering Devices; and I do hereby declare that the following is a full, clear, and exact description of the invention, such as will enable others skilled in the art to which it appertains to make and use the same, reference being had to the accompanying drawings, which form a part of this specification.

This invention relates to a stock-watering device.

The aim of my invention is to provide a stock-waterer so arranged that the water will be prevented from freezing in cold weather, and, further, presenting the advantage in that small openings are left exposed through which the animals may get at the water, as will be described more fully hereinafter.

Figure 1:
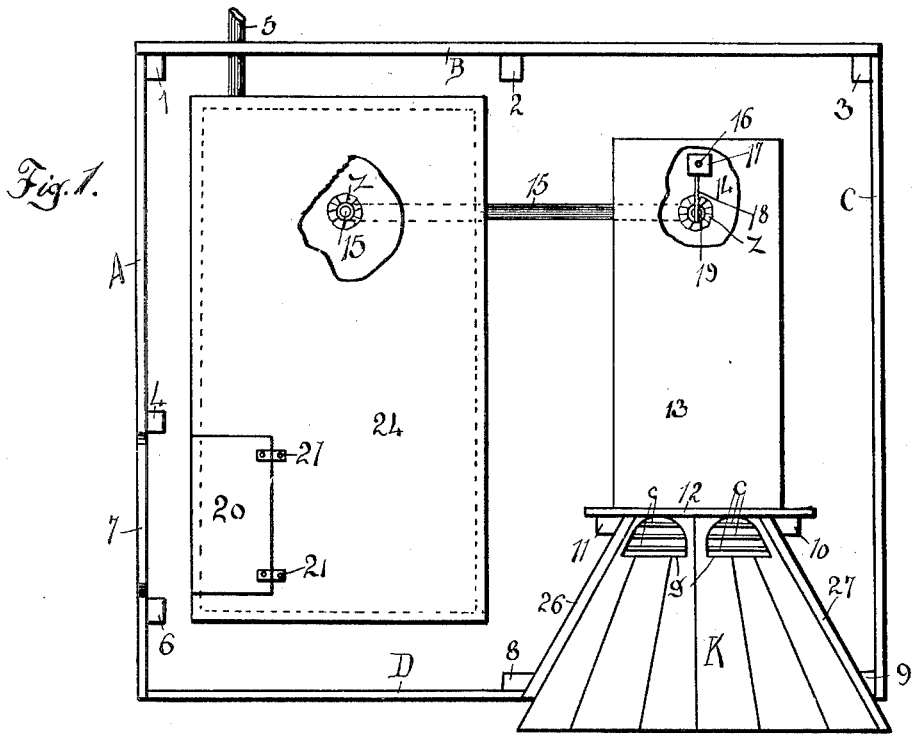
Figure 2:
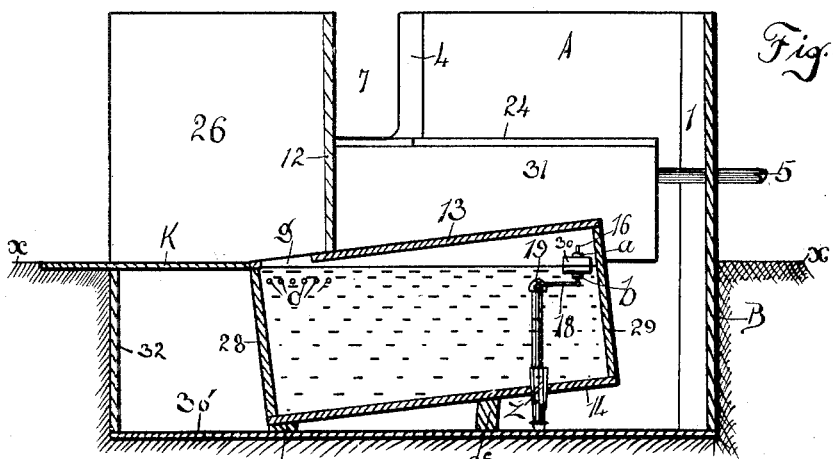

In the accompanying drawings I have shown in Figure 1 a top view of a stock-watering device embodying my invention. Fig. 2 shows a central sectional view thereof with a portion removed.

My invention embodies, essentially, a reservoir 24, into which is directed a supply-pipe 5, which may communicate with a pump, waterworks system, or with any other water-supply. This reservoir at a suitable point is provided with a lid-closed opening, the lid in the drawings being marked 20 and being secured to the top of the reservoir by means of hinges 21. Extending from this reservoir 24, which is filled from any desired source from time to time, is an auxiliary reservoir or water-tank 13. This water-tank is placed at a suitable distance below the reservoir 24, so that the water may gravitate from the reservoir to the tank 13. This tank comprises a top having openings and the ends 28 and 29 and the bottom 14. This tank is in pipe connection with the reservoir 24 by means of the pipe 15, and I make this pipe connection in a special way, as it is found that the tank or reservoir may settle so as to strain the connecting-pipe 15. In order to make the proper connection, I make an opening in the bottom of the reservoir as well as the tank of a size larger than pipe 15, which connects these two receptacles. Then I drive a plurality of wedge-shaped stakes around the pipe 15, so that an absolute water-tight connection is insured between the pipe and the receptacles' bottoms. To further insure a water-tight connection, tar or wax or any other material may be used as a covering for these stakes. Now should the tank 13 or reservoir 24 settle and strain the pipe 15 it will simply be necessary for the operator to drive the wedges a little tighter into their seating, when a water-tight connection will again be assured.

The tank 13, as has been stated, is a suitable distance below the reservoir, as shown in Fig. 2. In order to control the water-supply in the tank 13, I provide an ordinary float-valve 19, to which is secured a lever 18, having a stem 16, upon which stem is held a float 30, which float is adjustably held upon the stem 16 by means of the nuts A and B. This float forms no part of my invention, and any ordinary float-valve may be used. This float is so arranged that the water-level within the tank is at an angle, as is shown in the drawings. In order to properly support this tank at an angle, the tank is supported upon the block 36. It will be noticed that the tank is below the earth-line *x x*, and I prefer to fill this inclosure within the ground, comprising the bottom 30' and the walls 32, B, C, D, and A. The wall 32 is a stub-wall and offers a support to the runway K, which is preferably made of suitable boards, which lead to the tank-opening. The walls A, B, C, and D project above the surface of the ground. This runway is closed by means of the walls 26, 27, and the wall 12, extending upward from the tank 13. To prevent animals stepping through the openings *g*, I provide a grate *c* below, as is shown in the drawings. At these openings *g*, which are on a level with the ground, the smaller animals, such as hogs, water.

The opening within the reservoir 24 is a suitable distance above the ground, as is shown in Fig. 2, where an opening 7 has been cut into the wall A, so that the cattle can readily get at the drink-opening within the reservoir 24. From this it will be noticed that I provide a reservoir from which the cattle may drink aboveground, a tank below the surface of the ground, and a wall or inclosure which completely surrounds these two water-receptacles. The walls surrounding these receptacles serve two purposes. In the first place they prevent the animals from walking over the water-receptacles, and in the second place they form a holder for a suitable packing, with which the entire inclosure is filled in winter. On farms and stock-ranches, where these tanks are mostly used, manure forms the best packing, as the same prevents the water from freezing within the receptacles. In winter the opening 20 is preferably closed every night and opened only during the time when the animals are drinking. The openings g are normally open, as it is found that the ice very seldom freezes to such a thickness that it cannot be readily broken by the animals.

Having thus described my invention, what I claim as new, and desire to secure by United States Letters Patent, is—

In a stock-watering device of the character described, an inclosure extending below the surface of the earth, of a reservoir within said inclosure, said reservoir being above the surface of the earth, a tank below the earth's surface provided with a suitable opening, a pipe extending from said reservoir into said tank, a float-operated valve at the pipe end within said tank, a grate below said opening within said tank, and an inclosed runway leading to the said grated opening within said tank, as and for the purpose set forth.

Signed in the presence of two witnesses.

NICKOLAUS WEHR.

Witnesses:
GEORGE W. SUES,
R. J. DAVENPORT.